US010889268B2

United States Patent
Nagendran et al.

(10) Patent No.: US 10,889,268 B2
(45) Date of Patent: Jan. 12, 2021

(54) ISOLATING CIRCUIT FOR WIPER SYSTEM

(71) Applicant: Caterpillar Inc., Peoria, IL (US)

(72) Inventors: Nithyanandam Nagendran, Trichy (IN); Richard Franklin Shults, LaGrange, GA (US)

(73) Assignee: Caterpillar Inc., Peoria, IL (US)

( * ) Notice: Subject to any disclaimer, the term of this patent is extended or adjusted under 35 U.S.C. 154(b) by 196 days.

(21) Appl. No.: 15/961,664

(22) Filed: Apr. 24, 2018

(65) Prior Publication Data
US 2019/0322243 A1   Oct. 24, 2019

(51) Int. Cl.
*B60S 1/08*   (2006.01)
*H02P 5/46*   (2006.01)
*B60S 1/38*   (2006.01)
*B60S 1/56*   (2006.01)

(52) U.S. Cl.
CPC .............. *B60S 1/0814* (2013.01); *B60S 1/38* (2013.01); *B60S 1/56* (2013.01); *H02P 5/46* (2013.01)

(58) Field of Classification Search
CPC ........ B60S 1/08; B60S 1/0814; B60S 1/0807; B60S 1/56; B60S 1/566; B60S 1/58; B60S 1/583; H02P 5/46; H02P 5/00; H02P 1/04
USPC .............. 15/250.13, 250.11, 250.12, 250.17; 318/443, DIG. 2, 41, 62
See application file for complete search history.

(56) References Cited

U.S. PATENT DOCUMENTS

| 4,670,695 | A | | 6/1987 | Licata |
| 5,216,340 | A | | 6/1993 | Welch |
| 5,568,026 | A | | 10/1996 | Welch |
| 6,147,466 | A | * | 11/2000 | Stronczek ............. B60S 1/0814 318/41 |
| 6,281,649 | B1 | | 8/2001 | Ouellette |
| 6,946,810 | B2 | | 9/2005 | Kohlrausch |
| 7,355,360 | B2 | | 4/2008 | Assan |

FOREIGN PATENT DOCUMENTS

| CN | 1611395 | 5/2005 |
| DE | 4032922 | 4/1992 |

* cited by examiner

*Primary Examiner* — Gary K. Graham
(74) *Attorney, Agent, or Firm* — Oblon, McClelland, Maier & Neustadt (57) ABSTRACT

A wiper system for a machine is provided. The wiper system includes a first motor configured to operate a first wiper and a second motor configured to operate a second wiper wherein the first motor and the second motor are connected in a parallel configuration. The wiper system further includes a power source which is in electrical connection with the first and the second motors for energizing each motor to move the respective wipers. The wiper system includes a switch configured to simultaneously operate the first motor and the second motor in one of a high speed mode, a low speed mode, or a park mode. The wiper system includes an isolating circuit configured to isolate the first motor from the power source and allow the second motor to run independent of the first motor when the switch is set in the park mode and speed of the first motor is different from speed of the second motor.

17 Claims, 6 Drawing Sheets

ISOLATING CIRCUIT FOR WIPER SYSTEM

TECHNICAL FIELD

The present disclosure relates to systems and circuits for controlling wipers of a machine. More specifically, the present disclosure relates to a system and a circuit for temporarily isolating a wiper motor from the power source.

BACKGROUND

In the forestry industry, it is common for trees to be cut down and then hauled to a central collection point for further processing. One type of machine used for loading and transporting logs is typically referred to as a wheel skidder. The wheel skidder typically includes a frame that may be unitary or articulated in one or more locations and is supported on a plurality of wheels or other ground engaging members. An operator station or cab is mounted onto a portion of the frame. As the operation of the machine, often in heavily forested areas, may result in dirt and debris, the wheel skidder is provided with one or more windshields, for example, front and rear windshield, to shield the operator from the environment. Front and rear windshields are provided with respective wipers to clean the windshields and maintain a clear field of vision for the operator.

Commonly, wiper systems of the machine include wipers, wherein each wiper is operated by its own wiper motor. Further, in some cases, two identical wiper motors (for front and rear wipers) are connected parallelly and a common switch is used to control the operation of the wiper motors. Due to slight differences in design and construction of the wiper motors, it may be possible that speed of one of the wiper motors is more than that of the other wiper motor. Thus, the wiper associated with the faster wiper motor will reach the park position earlier than the wiper associated with the slower wiper motor. The faster wiper motor parks earlier than the slower wiper motor. As the wiper motors are connected parallelly, all the terminals of the faster wiper motor are connected to the corresponding terminals of the slower wiper motor. Due to the early parking of the faster wiper motor, one or more terminals of the faster wiper motor get connected to ground whereas the corresponding terminals of the slower wiper motor are still connected to the power source. This result in short-circuit of the power source supplying power to the wiper motors.

Accordingly, there is a need to provide a circuit and a system for controlling wipers of a machine that enables more efficient operation of the wiper system of the machine.

SUMMARY

In an aspect of the present disclosure, a wiper system for a machine is provided. The wiper system includes a first motor configured to operate a first wiper and a second motor configured to operate a second wiper, wherein the first motor and the second motor are connected in a parallel configuration. The wiper system further includes a power source which is in electrical connection with the first and the second motors for energizing each motor to move the respective wipers. The wiper system includes a switch configured to simultaneously operate the first motor and the second motor in one of a high speed mode, a low speed mode, or a park mode. The wiper system includes an isolating circuit configured to isolate the first motor from the power source and allow the second motor to run independent of the first motor when the switch is set in the park mode and speed of the first motor is different from speed of the second motor.

In another aspect of the present disclosure, a wiper system for a machine is provided. The wiper system includes a first motor configured to operate a first wiper and a second motor configured to operate a second wiper, wherein the first motor and the second motor are connected in a parallel configuration. The wiper system includes a power source in electrical connection with the first and the second motors for energizing each motor to move the respective wipers. The wiper system includes a switch configured to simultaneously operate the first motor and the second motor in one of a high speed mode, a low speed mode, or a park mode. The wiper system includes an isolating circuit configured to isolate the first motor from the power source when the first wiper reaches the park position and when the switch is set in the park mode and speed of the first motor is different from speed of the second motor.

In yet another aspect of the present disclosure, a retrofittable isolating circuit for use in a wiper system is provided. The wiper system includes a first and a second motor configured to operate a first and a second wiper respectively, wherein the first motor and the second motor are connected in a parallel configuration. The wiper system includes a power source and a switch configured to simultaneously operate the first motor and the second motor in one of a high speed mode, a low speed mode, or a park mode. The retrofittable isolating circuit is configured to isolate the first motor from the power source and allow the second motor to run independent of the first motor when the switch is in the park mode and speed of the first motor is different from speed of the second motor.

DETAILED DESCRIPTION

Figure 1:
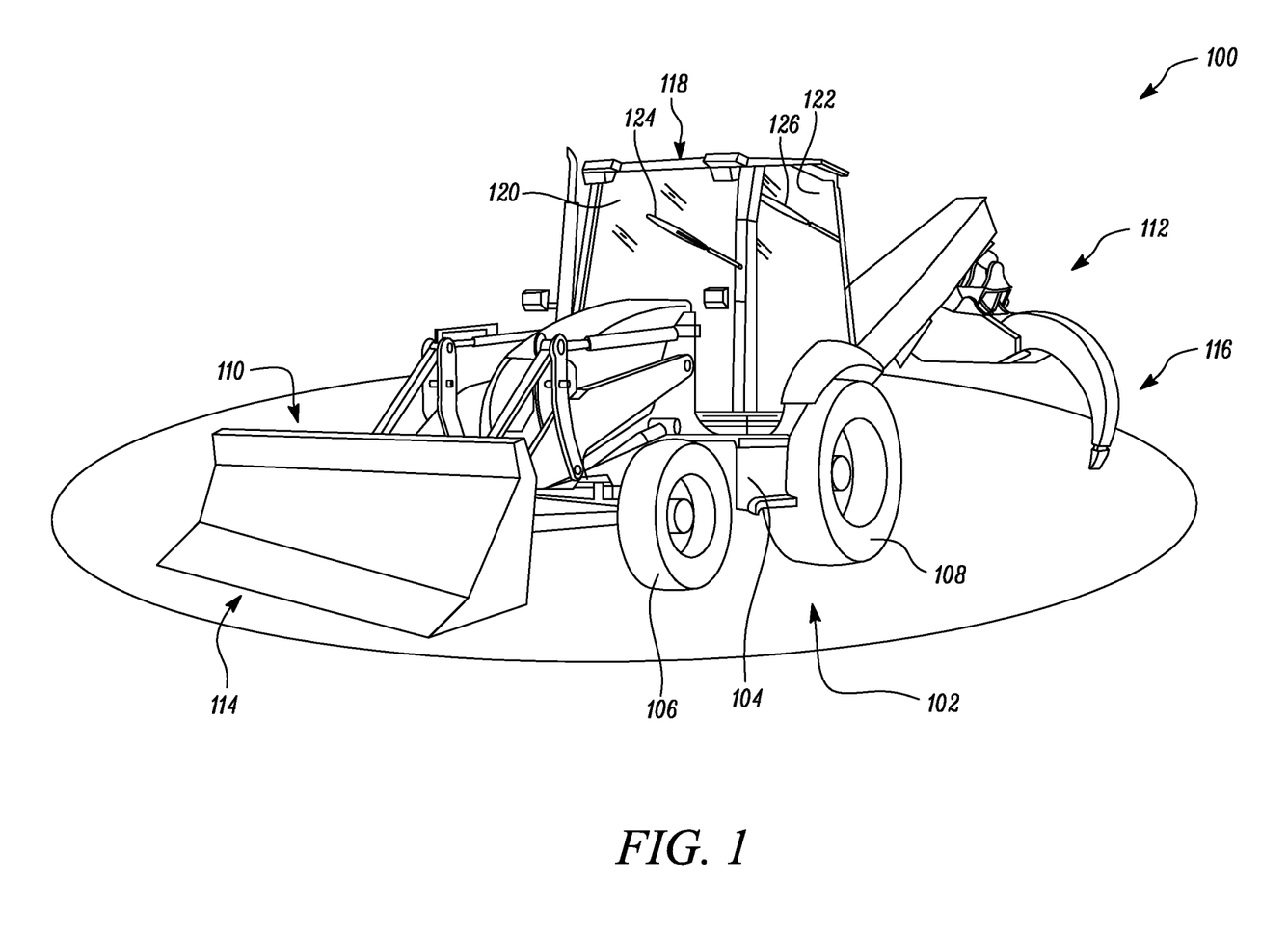
FIG. 1 shows a perspective view of an exemplary machine, according to an aspect of the present disclosure.

Wherever possible, the same reference numbers will be used throughout the drawings to refer to same or like parts. FIG. 1 shows an exemplary machine 100 illustrated as a wheel skidder which may be employed in connection with embodiments of the disclosure. The machine 100 may also be any other type of machine such as an excavator, a dozer, a track type tractor etc. While the following detailed description describes an exemplary aspect with respect to the wheel skidder, it should be appreciated that the description applies equally to the use of the present disclosure in other machines as well. The machine 100 may include a tractor 102 having a chassis 104. The tractor 102 may include a pair of front wheels 106 and a pair of rear wheels 108. It should be understood that, instead of the front and rear wheels 106, 108, the tractor 102 may include a pair of tracks or any other such ground engaging means to facilitate transportation of the tractor 102 on a ground surface.

The machine 100 may include a first implement 110 and a second implement 112. The first implement 110 may be provided in the form of a loader bucket at a first end 114 of the tractor 102, and suitable operating linkages may be provided for manipulation of the loader bucket. The first implement 110 may be used to move earth or soil as per application requirements. The machine 100 may include the second implement 112 to carry the items such as logs of wood. As shown, the second implement 112 includes grab arms 116 for holding the logs of wood.

The machine 100 further includes an operator cab 118 provided with a seat to accommodate an operator of the machine 100. The operator cab 118 may include a plurality of machine controls for controlling the operation of the machine 100. The machine controls may include, for example, a steering wheel, and/or control mechanisms disposed on the arms of the seat itself, such as one or more joysticks, buttons, or switches. To allow the operator to view the environment forward, to the sides, and to the rear, the operator cab 118 includes a plurality of windshields 120, 122. While only two windshields 120, 122 (front and rear) are illustrated in FIG. 1, additional windshields may be provided on front, rear, or sides, based on application requirements. Further, each of the windshields 120, 122 are provided with at least one respective windshield wiper 124, 126 respectively. The operator cab 118 further includes controls that enable operation of the wipers 124, 126. Further, the wiper arrangement may be provided with additional functionality beyond a conventional on/off arrangement such that actuation may control the speed of the wipers 124, 126.

Figure 2:
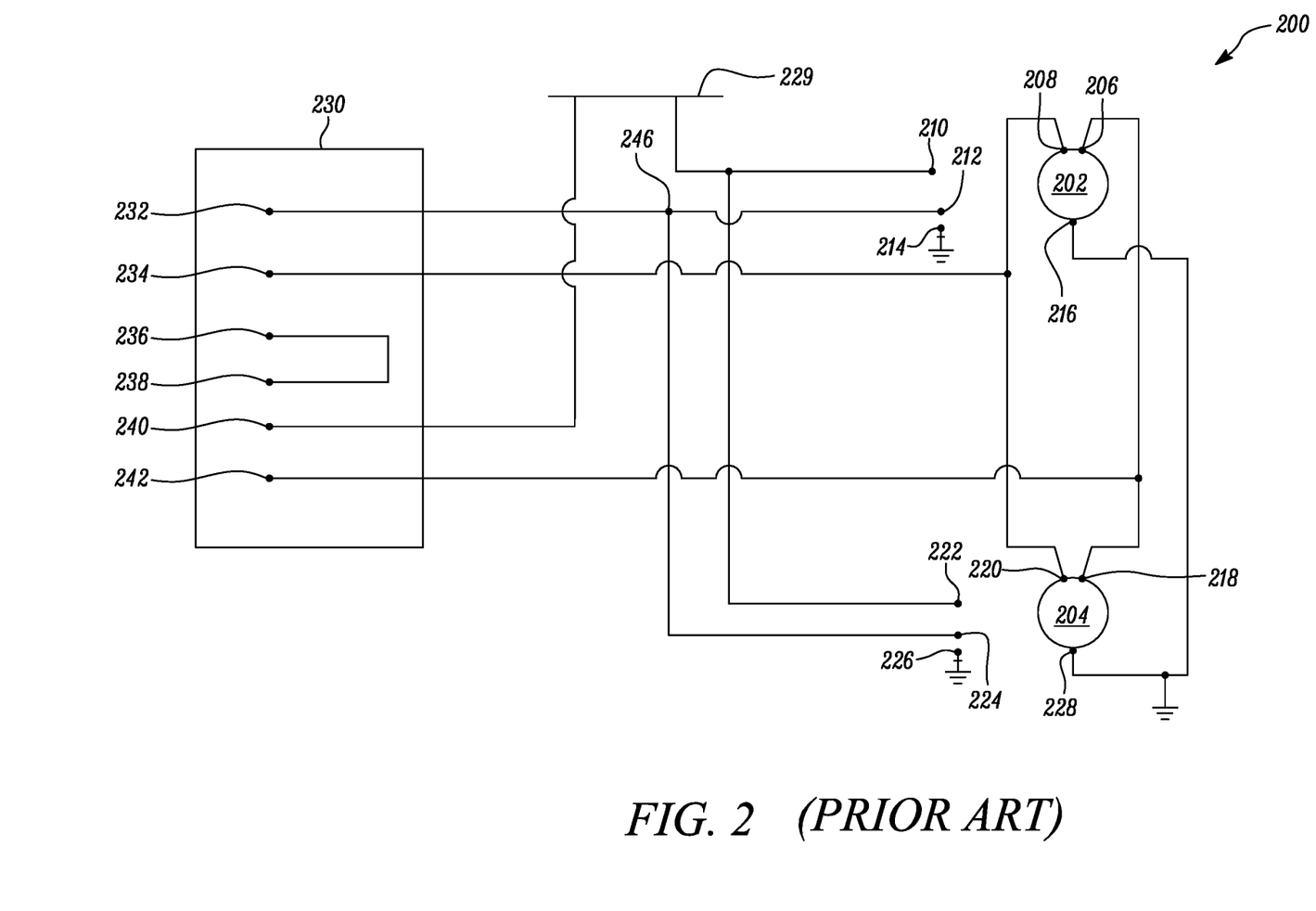
FIG. 2 schematically shows a conventional wiper system of the machine.

FIG. 2 schematically illustrates a traditional wiper system 200 comprising motors 202, 204 configured to operate wipers 124, 126 respectively. The motors 202, 204 are connected to the wipers 124, 126 via respective linkages (not shown). Each of the motors 202, 204 have six terminals. As shown, the motor 202 has a high speed terminal 206, a low speed terminal 208, a supply terminal 210, a park terminal 212, and ground terminals 214, 216. Similarly, the motor 204 has a high speed terminal 218, a low speed terminal 220, a supply terminal 222, a park terminal 224, and ground terminals 226, 228. The supply terminals 210, 222 are connected to a power source 229, for example, a battery providing 24 volts voltage. The ground terminals 214, 216, 226, 228 are electrically grounded. As shown in FIG. 2, the motors 202 and 204 are connected in a parallel configuration meaning that all the terminals of the motor 202 are connected to corresponding terminals of the motor 204.

The connection of the park terminals 212, 224 are changed as per the position of the wiper. The wiper system 200 may include a position sensor (not shown) configured to indicate the position of the wipers 124, 126 to the motors. When the wiper 124 is moving (i.e. not in the park position), the park terminal 212 of the motor 202 is connected to the supply terminal 210. When the wiper 124 stops, i.e. the wiper 124 reaches its park position, the park terminal 212 of the motor 202 is connected to the ground terminal 214. Similarly, when the wiper 126 is moving (i.e. not in the park position), the park terminal 224 of the motor 204 is connected to the supply terminal 222. When the wiper 126 stops, i.e. the wiper 126 reaches its park position, the park terminal 224 of the motor 204 is connected to the ground terminal 226.

The wiper system 200 includes a switch 230 configured to simultaneously operate the motors 202, 204 in various modes. In one implementation, the switch 230 may be a rocker switch. The switch 230 may be capable of being centrally depressed and moved up and down and left and right in order to provide the desired inputs by the operator. The switch 230 is configured to operate in one of a low speed mode, a high speed mode, and a park mode. For example, when the low speed mode of the switch 230 is selected, the motors 202, 204 operate at low speed and accordingly the respective wipers 124, 126 move at low speed.

As shown in FIG. 2, the switch 230 is provided with six terminals 232, 234, 236, 238, 240, and 242. The terminal 232 is connected to the park terminals 212, 224 of motors 202, 204. The terminal 234 is connected to the low speed terminals 208, 220 of motors 202, 204. The terminal 242 is connected to the high speed terminals 206, 218 of motors 202, 204. The terminal 240 is connected to the power source 229 to provide supply voltage. The terminals 236 and 238 are internally connected in the switch 230.

The terminals 232-242 of the switch 230 are connected to each other in different configurations depending on the mode selected. When the low speed mode of the switch 230 is selected, terminals 234 and 236 are connected and terminals 238 and 240 are connected. In high speed mode, terminals 234 and 236 are connected and terminals 240 and 242 are connected. In park mode, terminals 232 and 234 are connected and terminals 238 and 240 are connected.

In low speed mode of the switch 230, the terminal 234 is connected to the terminal 236 and the terminal 238 is connected to the terminal 240. As the terminal 240 is already connected to the power source 229, the terminals 238, 236, and 234 also get connected to the power supply. Thus, current flows from the power source 229 to the low speed terminals 208, 220 of the motors 202, 204 via the terminals 240, 238, 236, and 234. As a result, both the motors 202, 204 run at low speed and consequently, the wipers 124 and 126 move at low speed.

In high speed mode of the switch 230, the terminal 234 is connected to the terminal 236 and the terminal 242 is connected to the terminal 240. As the terminal 240 is already connected to the power source 229, the terminal 242 gets connected to the power supply. Thus, current flows from the power source 229 to the high speed terminals 206, 218 of the motors 202, 204 via the terminals 240 and 242. As a result, both the motors 202, 204 run at high speed and consequently, the wipers 124 and 126 move at high speed.

In park mode of the switch 230, the terminal 234 is connected to the terminal 232 and the terminal 238 is connected to the terminal 240. Further, the terminal 232 is connected to the park terminal 212 of the motor 202 and the park terminal 224 of the motor 204. When both the wipers 124 and 126 are moving, the park terminal 212 is connected to the supply terminal 210 and the park terminal 224 is connected to the supply terminal 222. As a result, a first current flows from the supply terminal 210 to the park terminal 212 and subsequently passes through a node 246. Also, a second current flows from the supply terminal 222 to the park terminal 224 and reaches the node 246 where it combines with the first current and the combined current flows through the terminals 232, 234 and is again divided to reach the low speed terminals 208, 220 of the motors 202, 204.

Typically, the motors 202, 204 are of same type and have same specifications and as a result both the wipers 124, 126 reach their respective park position simultaneously. However, due to slight differences in the construction and design, the motors 202 and 204 may not operate at same speed at all times. For example, the motors 202, 204 may have speed rating of 40 revolutions per minute (rpm) with a tolerance value of +5 rpm. Thus, one of the motors 202, 204 may run at 35 rpm while the other motor may run at 45 rpm. In such scenarios, one of the wipers 124, 126 would reach the park position earlier than the other wiper.

In one case, the motor 202 may be running faster than the motor 204. When the switch 230 is set in the park mode, both the wipers 124 and 126 would tend to reach their respective park position and stop. However, due to the higher speed of the motor 202, the wiper 124 corresponding to the motor 202 reaches the park position earlier. Upon detecting that the wiper 124 has reached the park position, the connection of the park terminal 212 is changed. The park terminal 212 now gets connected to the ground terminal 214 whereas the park terminal 224 is still connected to the supply terminal 222. As both the park terminals 212, 224 are connected at node 246, it results in short-circuit. A fuse (not shown) connected to the power source 229 may blow out due to the short-circuit. Similar situation of short-circuit also arises in another scenario when the motor 204 is running faster than the motor 202.

Figure 3:
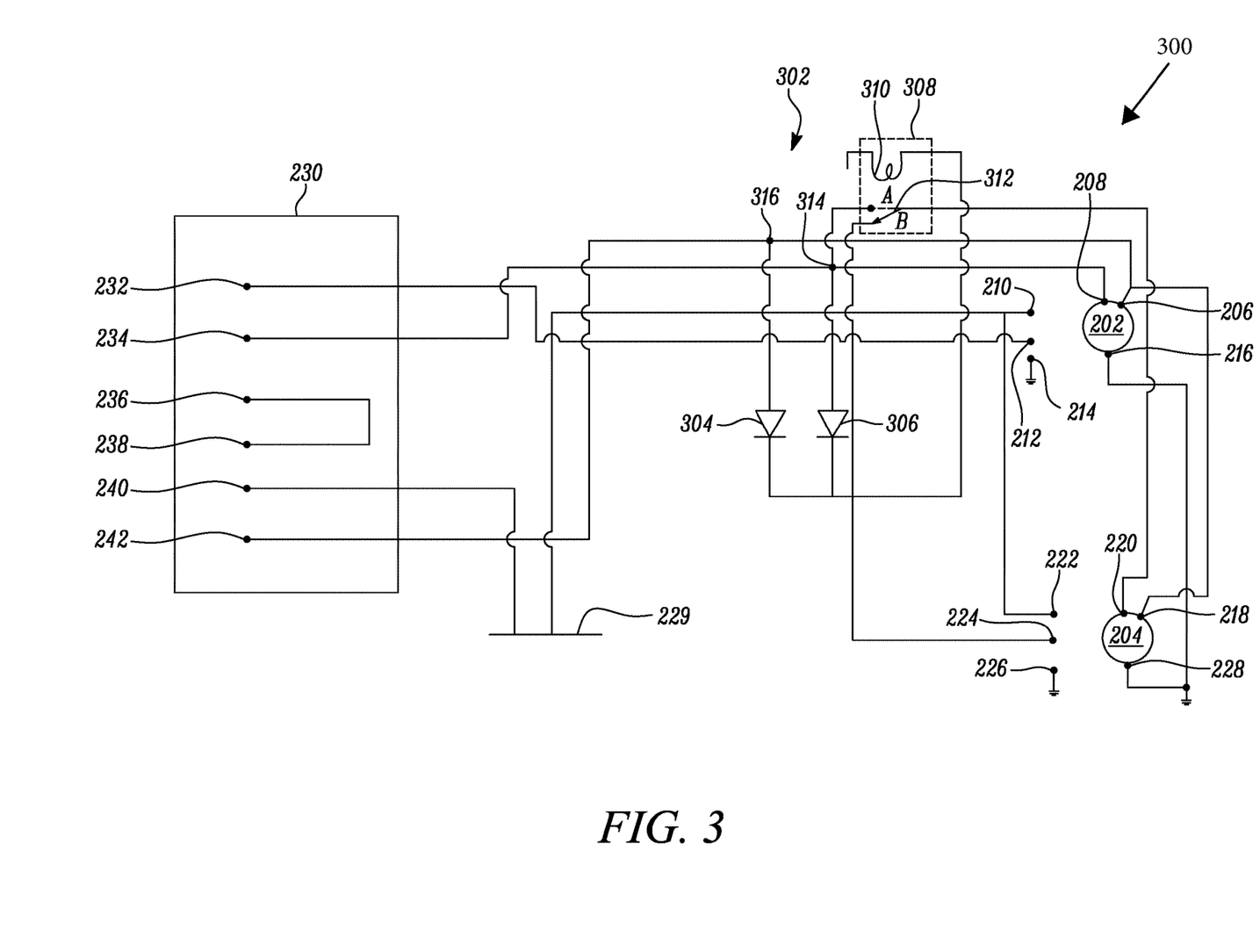
FIG. 3 is a schematic of the wiper system of the machine, according to an aspect of the present disclosure.

FIG. 3 illustrates a schematic of a wiper system 300 of the machine 100 in accordance with certain embodiments of the present disclosure. The wiper system 300 includes an isolating circuit 302 configured to selectively isolate one of the wiper motors 202, 204 from the supply voltage. The isolating circuit 302 includes a first diode 304, a second diode 306, and a relay 308. The relay 308 includes a coil 310 and a switch 312. When the coil 310 is energized by a current flowing through it, the switch 312 is turned ON, i.e. the switch connection moves from position B to position A as shown in FIG. 3. The first diode 304 and the second diode 306 facilitate selective disconnection of one of the wiper motors 202, 204 from the power source 229 based on actuation of the relay 308.

In low speed mode of the switch 230, the terminal 234 is connected to the terminal 236 and the terminal 238 is connected to the terminal 240. As the terminal 240 is already connected to the power source 229, the terminals 238, 236, and 234 are also connected to the power supply. A terminal 314, which is connected to the terminal 234, also gets connected to the power supply resulting in forward biasing of the second diode 306. As a result, the coil 310 is energized and the switch 312 is turned ON, i.e. the switch connection moves from position B to position A.

Figure 4:
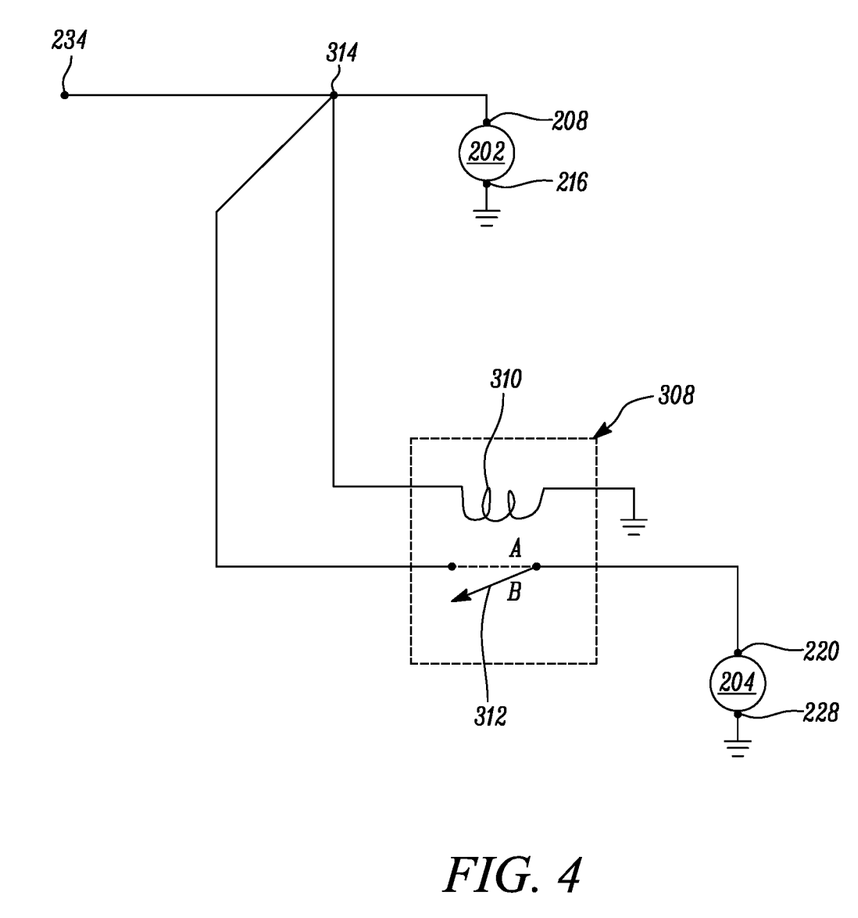
FIG. 4 is a schematic of the wiper system of the machine in low speed mode, according to an aspect of the present disclosure.

FIG. 4 schematically illustrates the operation of the wiper system 300 in the low speed mode, in accordance with certain embodiments of the present disclosure. As described earlier, in the low speed mode, the terminal 314 is connected to the power source 229 resulting in the switch 312 turning ON. As the terminal 314 is connected to low speed terminals 208, 220 of the motors 202, 204, the motors 202, 204 are energized to run at low speeds and consequently, the wipers 124, 126 move at low speeds.

Referring again to FIG. 3, in high speed mode of the switch 230, the terminal 234 is connected to the terminal 236 and the terminal 242 is connected to the terminal 240. As the terminal 240 is already connected to the power source 229, the terminal 242 gets connected to the power supply. A terminal 316, which is connected to the terminal 242, also gets connected to the power supply. The terminal 316 which is connected with the high speed terminals 206, 218 of the motors 202, 204 energizes the motors 202, 204 to run at high speeds. Consequently, the wipers 124, 126 coupled to the motors 202, 204 move at high speeds.

Moreover, as the terminal 316 is connected to power supply, the first diode 304 is forward biased. As a result, the relay 308 is energized and the switch 312 is turned ON i.e. the switch connection moves from position B to position A. Thus, the low speed terminals 208, 220 of the motors 202, 204 are connected to each other at the terminal 314 thereby maintaining the parallel configuration of the motors 202, 204 in the high speed mode.

Figure 5:
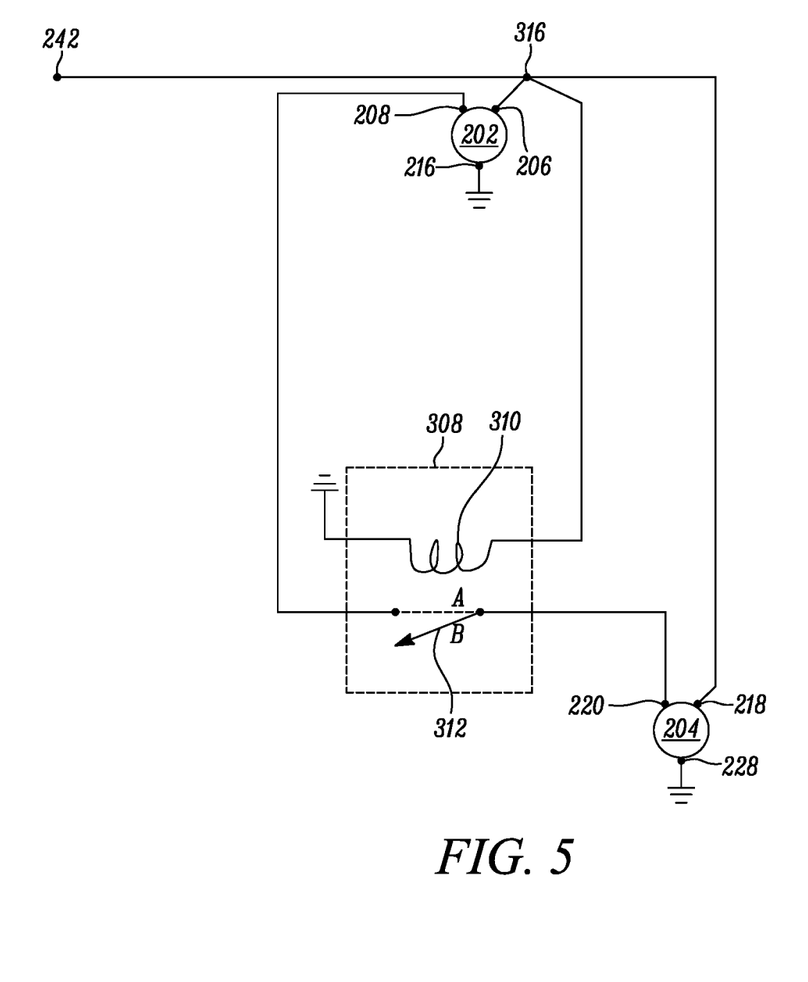
FIG. 5 is a schematic of the wiper system of the machine in high speed mode, according to an aspect of the present disclosure.

FIG. 5 schematically illustrates the operation of the wiper system 300 in the high speed mode, in accordance with certain embodiments of the present disclosure. In the high speed mode, the terminal 316 is connected to the power supply. Thus, the high speed terminals 206, 218 of the motors 202, 204 are energized resulting in operation of the motors 202, 204 at high speeds. Consequently, the wipers 124, 126 coupled to the motors 202, 204 also run at high speeds. Also, the first diode 304 is forward biased due to the connection of the power supply with the terminal 316 and consequently, the switch 312 is turned ON. Thus, low speed terminals 208, 220 of the motors 202, 204 are connected to each other as shown in FIG. 5.

Figure 6:
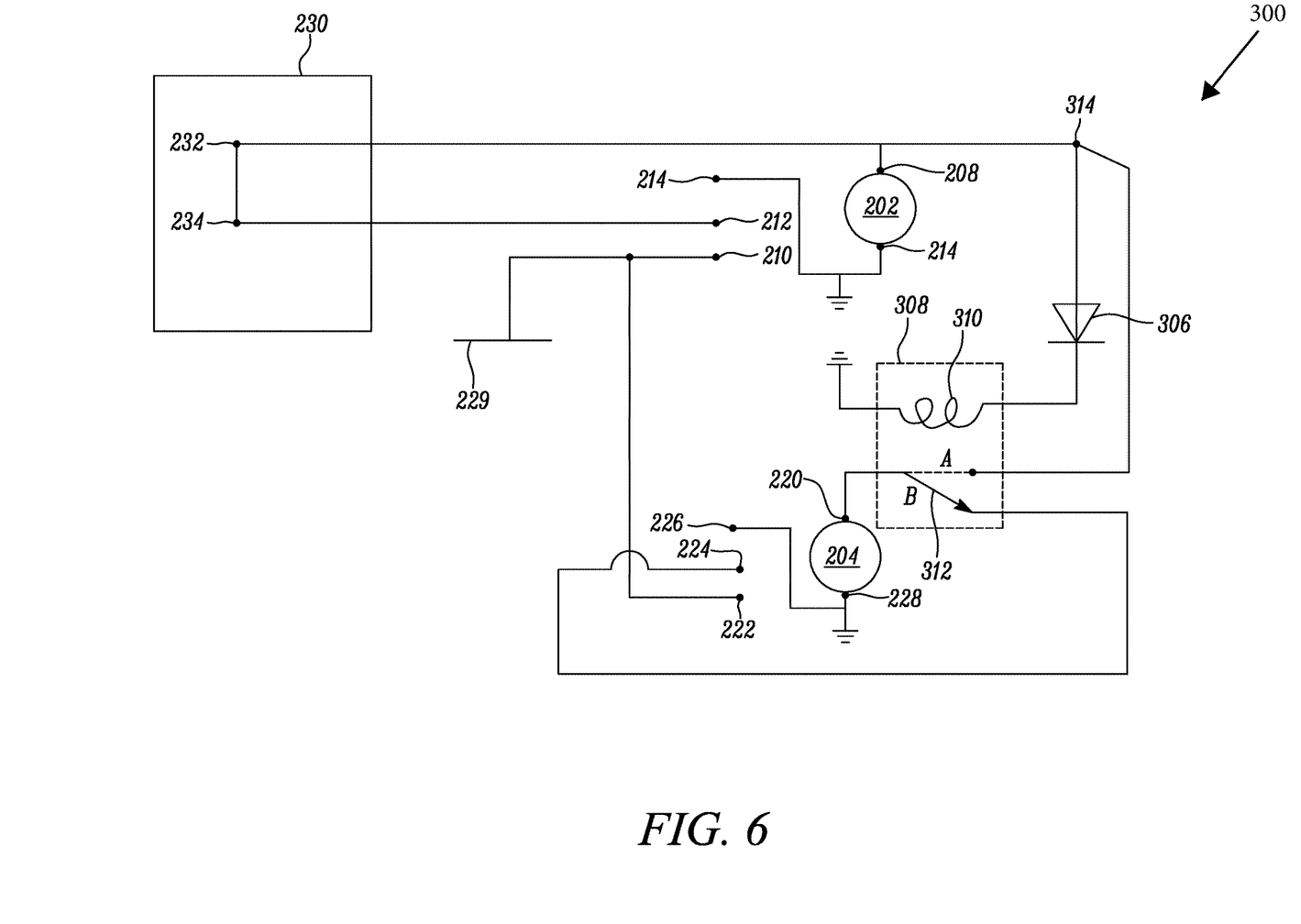
FIG. 6 is a schematic of the wiper system of the machine in park mode, according to an aspect of the present disclosure.

Referring to FIG. 3, in park mode of the switch 230, the terminal 234 is connected to the terminal 232 and the terminal 238 is connected to the terminal 240. Further, the terminal 232 is connected to the park terminal 212 of the motor 202 and the park terminal 224 of the motor 204. When both the wipers 124, 126 are moving i.e. not in park position, the park terminal 212 is connected to the supply terminal 210 and the park terminal 224 is connected to the supply terminal 222. As a result, current flows from the supply terminal 210 to the park terminal 212 and goes to the low speed terminal 208 of the motor 202 via the terminal 314. Due to the presence of power supply at the terminal 314, the second diode 306 is forward biased and the relay 308 is turned ON. FIG. 6 schematically illustrates the operation of the wiper system 300 in the park mode, in accordance with certain embodiments of the present invention. Current flows from the terminal 314 to the low speed terminal 220 of the motor 204 via the switch 312. Thus, both the motors 202, 204 run at low speed and control the wipers 124, 126 such that the wipers 124, 126 reach their respective park position.

In one embodiment, the motor 202 may run faster than the motor 204. Due to this, a situation may arise in which the wiper 124 coupled with the motor 202 reaches the park position whereas the wiper 126 coupled with the motor 204 has not reached the park position. In such scenario, the park terminal 212 is connected to the ground terminal 214 whereas the park terminal 224 is connected to the supply terminal 222. As terminals 234 and 232 are connected in the park mode of the switch 230, the ground voltage reaches the terminal 314 which is connected to the low speed terminal 208 of the motor 202. As a result, the motor 202 comes to a halt. Further, the second diode 306 is reverse biased due to ground voltage at the terminal 314 and hence the relay 308 is turned OFF i.e. the connection of the switch 312 moves from the position A to the position B. Referring to the motor 204, as the wiper 126 has not reached the park position, the park terminal 224 is connected to the supply terminal 222. Thus, current flows from the supply terminal 222 to the low speed terminal 220 via the park terminal 224. The motor 204 runs at low speed until the wiper 126 reaches the park position. Thus, the isolating circuit 302 enables independent operation of the motor 204. When the wiper 126 reaches the park position, the park terminal 224 is connected to the ground terminal 226. As a result, the motor 204 comes to a halt.

In another scenario, the motor 204 may run at a speed higher than the speed of the motor 202. In this case, the isolating circuit 302 is configured to isolate the motor 202 from the power source 229 when the wiper 124 reaches the park position and the motor 202 stops running. Meanwhile, the motor 204 is allowed to run independent of the motor 202 until the wiper 126 reaches the park position. In both the scenarios described above, when one of the wipers, for example, the wiper 126 reaches the park position and the wiper 124 has not yet reached the park position, the motor 202 associated with the wiper 124 which has not parked may generate a voltage on the high speed terminal 206. Thus, a high voltage may be provided to the terminal 316 which may result in forward biasing of the diode 304. Subsequently, the relay 308 may be energized and the switch 312 may be turned ON. However, the motor 204 associated with the wiper 126 which has already parked pushes the high speed terminals 206, 218 to ground. This keeps the relay 308 from energizing due to the voltage generated on the high speed terminal 206 by the motor 202 associated with the wiper 124 which has not parked.

INDUSTRIAL APPLICABILITY

The present disclosure provides an isolating circuit 302 for the wiper system 300 of the machine 100. Specifically, when the switch 230 is set in the park mode and the motors 202, 204 are running at different speeds, the isolating circuit 302 is configured to isolate the motor 202 from the power source 229 so that the short-circuit of the power source 229 is avoided. Meanwhile, the motor 204 is configured to run independent of the motor 202. The motor 204 stops when the wiper 126 reaches its respective park position. In certain embodiments, the isolating circuit 302 is designed in a manner that it is retrofittable to the wiper systems 300 of the machine 100.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof

What is claimed is:

1. A wiper system comprising:
a first motor configured to operate a first wiper;
a second motor configured to operate a second wiper wherein the first motor and the second motor are connected in a parallel configuration;
a power source in electrical connection with the first motor and the second motor for energizing each motor to move the respective wipers;
a switch configured to simultaneously operate the first motor and the second motor in one of a high speed mode, a low speed mode, or a park mode; and
an isolating circuit configured to isolate the first motor from the power source and allow the second motor to run independent of the first motor when:
the switch is set in the park mode, and
speed of the first motor is different from speed of the second motor,
wherein the isolating circuit includes a single relay electrically connected to low speed terminals of the first motor and the second motor, a first diode electrically connected to high speed terminals of the first motor and the second motor, and a second diode electrically connected to the low speed terminal of the first motor and the only one relay.

2. The wiper system of claim 1, wherein, in the parallel configuration, a high speed terminal of the first motor is directly electrically connected to the high speed terminal of the second motor.

3. The wiper system of claim 1, wherein the isolating circuit consists of the first diode, the second diode, and the single relay.

4. The wiper system of claim 1, wherein the isolating circuit is configured to isolate the first motor from the power source when the first wiper reaches the park position.

5. The wiper system of claim 1, wherein the isolating circuit is configured to allow the second motor to run independent of the first motor until the second wiper reaches the park position.

6. The wiper system of claim 1, wherein the switch is a rocker switch.

7. The wiper system of claim 1, wherein the first wiper and the second wiper are disposed on a front windshield and a rear windshield of a machine respectively.

8. A wiper system comprising:
a first motor configured to operate a first wiper;
a second motor configured to operate a second wiper wherein the first motor and the second motor are connected in a parallel configuration;
a power source in electrical connection with the first motor and the second motor for energizing each motor to move the respective wipers;
a switch configured to simultaneously operate the first motor and the second motor in one of a high speed mode, a low speed mode, or a park mode; and
an isolating circuit configured to isolate the first motor from the power source when:
the switch is set in the park mode,
speed of the first motor is different from speed of the second motor, and
the first wiper reaches the park position,
wherein, in the parallel configuration, a high speed terminal of the first motor is electrically directly connected to a high speed terminal of the second motor.

9. The wiper system of claim 8, wherein the isolating circuit comprises of a first diode, a second diode, and a relay.

10. The wiper system of claim 8, wherein the isolating circuit is further configured to allow the second motor to run independent of the first motor until the second wiper reaches the park position.

11. The wiper system of claim 8, wherein the switch is a rocker switch.

12. The wiper system of claim 8, wherein the first wiper and the second wiper are disposed on a front windshield and a rear windshield of a machine respectively.

13. A wiper system comprising:
a switch configured to simultaneously operate a first motor and a second motor, which are connected in a parallel configuration, in one of a high speed mode, a low speed mode, or a park mode; and
an isolating circuit configured to isolate the first motor from a power source and allow the second motor to run independent of the first motor when:
the switch is set in the park mode, and
speed of the first motor is different from speed of the second motor,
wherein a first terminal electrically directly connects to the isolating circuit, the switch, and the first motor, wherein a second terminal, different from the first terminal, electrically directly connects to the switch, the first motor, and the second motor, wherein the first terminal electrically directly connects to a second diode of the isolating circuit, wherein the second terminal electrically directly connects to a first diode of the isolating circuit, and wherein ends of the first and second diodes opposite the second and first terminals are coupled together and to a relay of the isolating circuit.

14. The wiper system of claim 13, further comprising a power source in electrical connection with the first motor and the second motor to energize each of the first motor and the second motor to move respective wipers.

15. The wiper system of claim 13, wherein the isolating circuit consists of the first diode, the second diode, and the relay.

16. The wiper system of claim 13, wherein in the parallel configuration the high speed terminal of the first motor is directly electrically connected to the high speed terminal of the second motor.

17. The wiper system of claim 13, wherein the switch is a rocker switch.

\* \* \* \* \*